Figure 1:
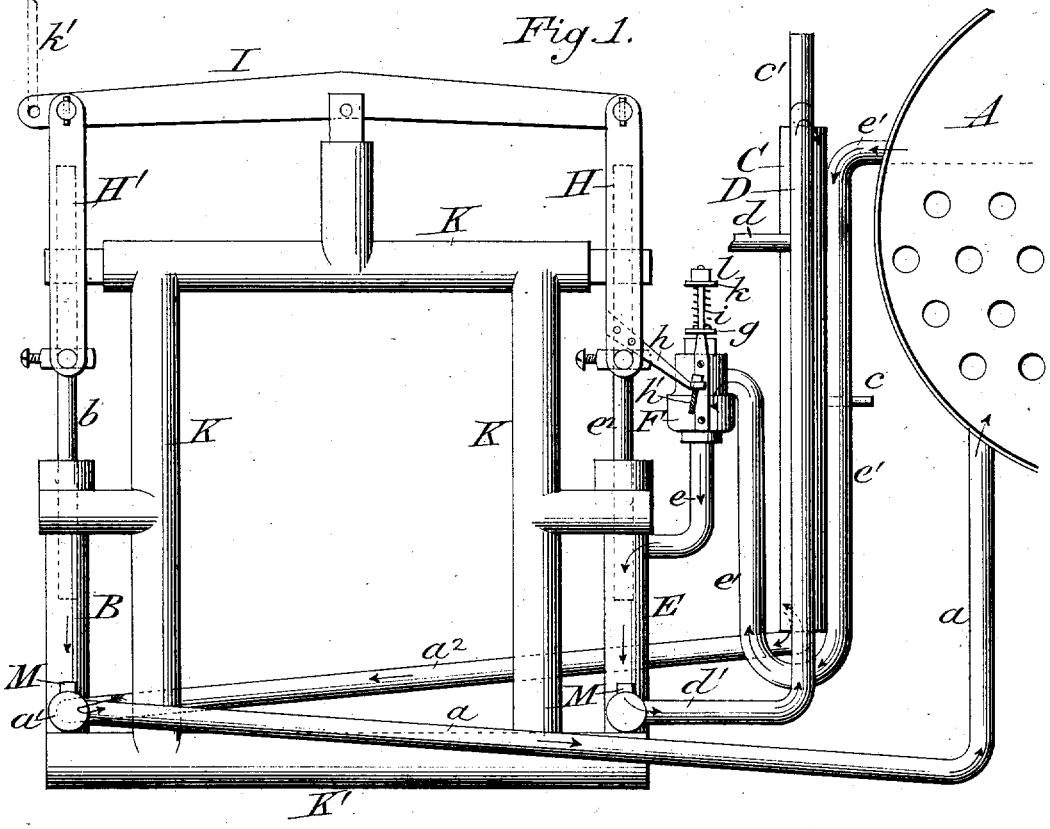

N. CLUTE.

FEED WATER REGULATOR.

No. 10,107. Reissued May 9, 1882.

Attest:
F. H. Schott
A. R. Brown

Inventor:
Nicholas Clute
by John C. Paster
atty

N. PETERS, Photo-Lithographer, Washington, D. C.

N. CLUTE.

FEED WATER REGULATOR.

No. 10,107 Reissued May 9, 1882.

Attest:
F. H. Schott.
N. R. Brown

Inventor:
Nicholas Clute
per John C. Paska
atty.

N. PETERS, Photo-Lithographer, Washington, D. C.

UNITED STATES PATENT OFFICE.

NICHOLAS CLUTE, OF SCHENECTADY, NEW YORK.

FEED-WATER REGULATOR.

SPECIFICATION forming part of Reissued Letters Patent No. 10,107, dated May 9, 1882.

Original No. 247,889, dated October 4, 1881. Application for reissue filed January 19, 1882.

*To all whom it may concern:*

Be it known that I, NICHOLAS CLUTE, a citizen of the United States, residing at Schenectady, in the county of Schenectady and State of New York, have invented certain new and useful Improvements in Automatic Feed-Water Regulators for Steam-Boilers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to an automatic feed-water regulator for steam-boilers, the object being to provide an apparatus by which a constant supply of warm or hot water is fed to the boiler, so as to maintain a positive water-line therein, and thus obviate the liability to explosion that results from the ordinary intermittent feed.

To this end my invention consists, first, in an improved method of automatically supplying steam-boilers with more water than is evaporated, the surplus being conveyed from the boiler by means of an eduction-pipe at the water-line, whereby a uniform water-level is constantly maintained; second, in the combination, with a steam-boiler and a pump, of a receiver for hot and cold water, adapted to receive a supply of cold water and also the overflow hot water from the boiler, and to deliver its contents to the pump to be constantly fed to the boiler for the purpose of maintaining a uniform water-level therein; third, in a receiver for hot and cold water, having an overflow-nozzle, an air-vent, a supply pipe or pipes for hot and cold water, and an outlet to a pump, by means of which the boiler is supplied; fourth, in a cut-off check-valve consisting of a case containing a valve-seat and inclosing a valve attached to a stem projecting through a packing-box at the upper part of the case, and carrying a cross-bar for engagement with a trip attached to a yoke or a pump-plunger, said valve being held to its seat by pressure of water and steam from a boiler which connects with the valve-case above the valve, and by the tension of a spiral spring bearing upon the top of the valve-stem; fifth, in the combination, with a steam-boiler and supplying-pump, of a receiver and valve, whereby water is constantly supplied to the boiler and the overflow returned to the supply-pump through the intermediate connections; and, further, in certain details of construction, as hereinafter more fully set forth.

Figure 2:
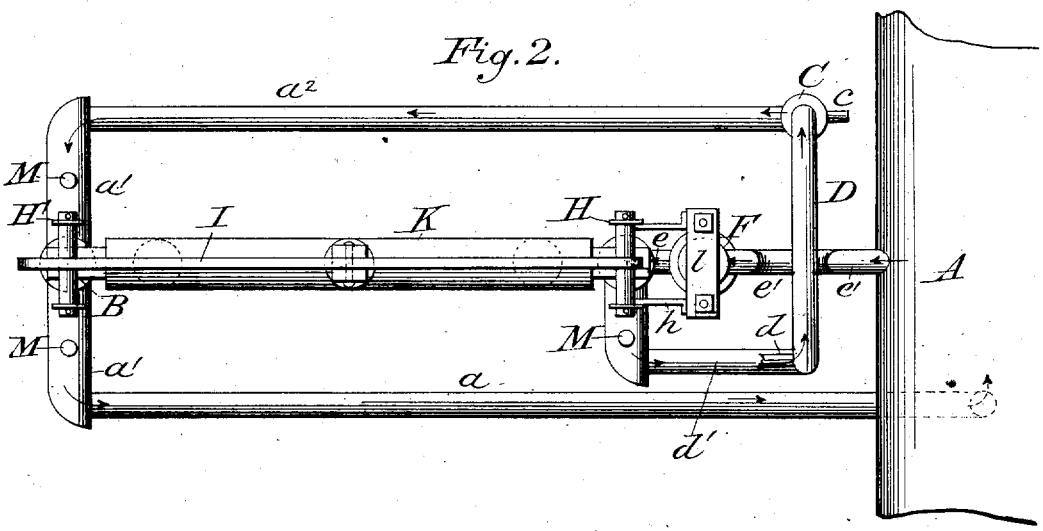
Figure 3:
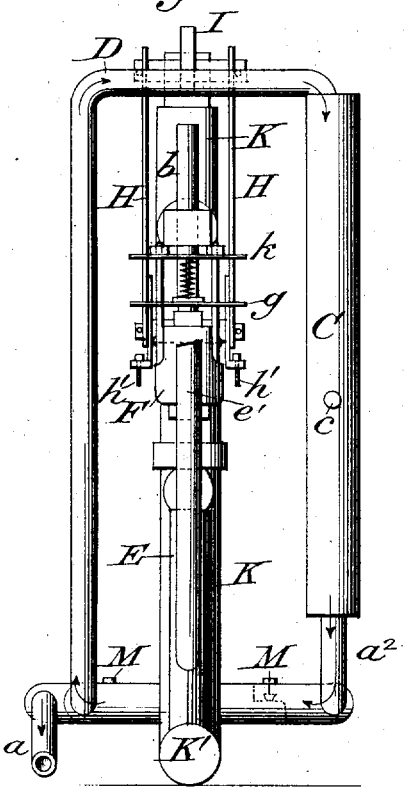
Figure 4:
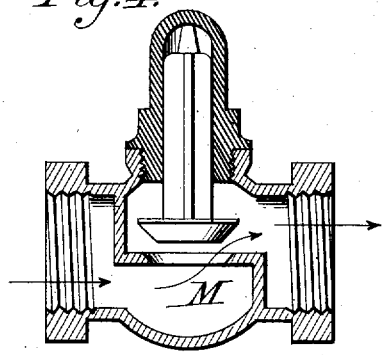
Figure 5:
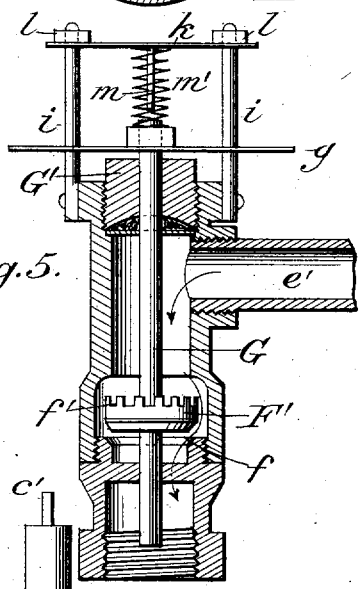
Figure 6:
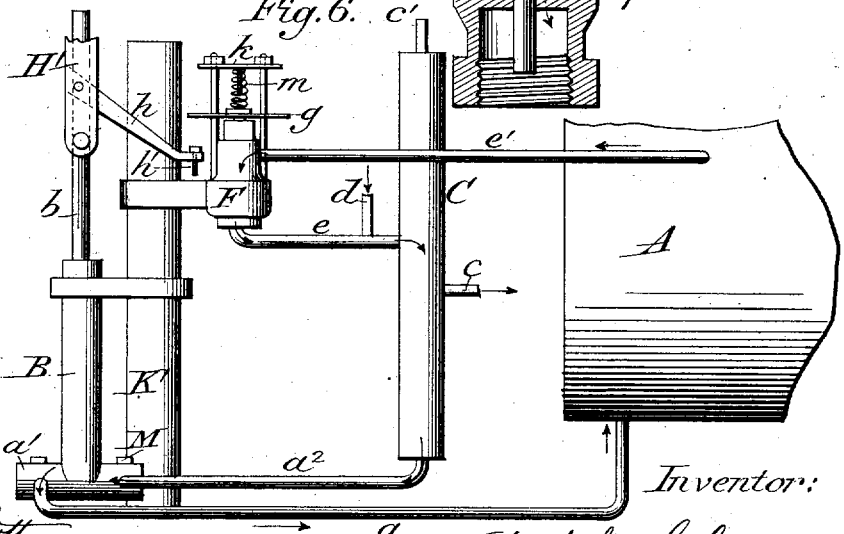

In the annexed drawings, which fully illustrate my invention, Figure 1 is a vertical elevation, illustrating one form of my improved feed-water apparatus. Fig. 2 is a plan of same. Fig. 3 is an end view with boiler removed. Fig. 4 is a sectional elevation of an ordinary check-valve. Fig. 5 is a sectional elevation of my improved cut-off check-valve, and Fig. 6 represents a modified form of my feed-water apparatus.

Like letters indicate like parts in the several views.

The letter A designates a steam-boiler, which is provided with a supply-pipe, *a*, that connects with the supply-pump B through the bend or connection *a'*, which contains an ordinary check-valve. This pump B is supplied with water from the receiver C through a pipe, $a^2$, a connection, *a'*, being interposed, which also contains a check-valve. The receiver C is connected with a pipe, D, having a branch, *d*, for the reception of cold water from any suitable supply, and a branch, *d'*, which connects with the hot-water pump E, as shown in Figs. 1 and 2. This pump is supplied with hot water from the boiler by the pipes *e e'*. Between the pipes *e e'* is a cut-off check-valve, F', which regulates the quantity of overflow-water and steam supplied to the pump E. It will thus be seen that the overflow hot water is mixed with cold water in the pipe D, and thence passed to the receiver C. The receiver C has an overflow-nozzle, *c*, at the side and an air-vent, *c'*, at the top.

The cut-off check-valve, arranged to communicate with the pipes *e e'*, consists of a casing, F, which is screw-threaded at its lower end to receive the pipe *e*, and has a screw-threaded opening in its side for the reception of the overflow-pipe *e'*. This case is made in sections, and contains a valve-seat, *f*, for a cup-valve, F', having a notched rim, *f'*. The cup-valve F' is attached to a valve-stem, G, which passes through a packing-box, G', at the top of the case, and carries on the outer side a cross-bar, *g*, which engages with the trips *h h*, that are attached to a yoke, H, secured to the beam I. These trips are each provided at their ends with a shoulder, through which passes a set-screw, *h'*, that may be adjusted to vary the lift of the valve. The sliding cross-bar *g* is perforated for the passage of the guide-studs *i i*, which support at their upper ends an adjustable cross-bar, *k*, which is held in place by the adjusting-nuts *l l* on the upper screw-threaded ends of the studs. The adjustable cross-bar *k* is provided with a downward-projecting pin, *m*, which serves as a guide for a spiral spring, *m'*, which connects the cross-bar *k* with the upper end of the valve-stem G. By this means it will be seen that after the valve-cup F' has been raised by the trips *h h* acting upon the cross-bar *g* to permit the passage of hot water from the boiler to the hot-water pump and receiver it is again seated to cut off this supply by means of the pressure of the inflowing water and steam from the pipe *e'*, which acts to partially close the valve when the trips descend from under the cross-bar, and this result is rendered certain and positive by the pressure of the spring *m'* upon the top of the valve-stem.

The supply-pump B and hot-water pump E are respectively connected by their plungers *b* $e^2$ with the yokes H H', attached to the beam I, which is supported in a suitable frame, K, and connected by a rod, *k'*, with a suitable engine.

It will be observed that by this apparatus I am enabled to secure a constant automatic feed to the steam-boiler, so as to maintain therein a uniform water-line, thus obviating the danger of explosion.

It will also be seen that by passing the overflow-water and steam from the boiler to a receiver, which is also supplied with cold water, I am enabled to heat the latter without the necessity of employing the ordinary heater.

By arranging the cut-off check-valve F' to be operated by the supply-pump B instead of by the hot-water pump E, I find that I can dispense with the latter pump and with the beam I. In this case the cut-off check-valve may be attached to a standard, K', near the supply-pump and operated by the trips *h h*, attached to a yoke, H', connected with the plunger *b*, as shown in Fig. 6. The hot-water pump E being dispensed with, the pipe *e* is connected directly with the receiver C, and the cold-water pipe *d* is attached thereto. This makes a more simple and economical arrangement of parts, and one that operates equally well as the construction heretofore described, the pressure of overflow-water from the boiler being sufficient to supply the receiver with hot water without the necessity of employing a hot-water pump.

In order to assist the action of the supply-pump, an ordinary check-valve, M, (shown in Fig. 4,) is placed in the bend *a'* on each side of the pump, the operation of which will be readily understood.

Feed-water regulators as ordinarily constructed and applied are arranged so as to supply the boiler in an intermittent manner, the water-line varying from time to time and to a greater or less extent, according to circumstances of operation or peculiarities of construction. In some instances the descent of the water within the boiler, resulting from its conversion into steam, permits the operation of certain devices by which a further supply of water is introduced to the boiler, so as to raise the water-line, while the construction of other feed-water regulators is such that a uniform water-line can be maintained only by a mode of operation that causes a large waste of steam.

It will be apparent that by supplying the boiler with a constant feed of more water than is evaporated or required to be made into steam, conveying the excess of heated water from the boiler by means of eduction-tubes at the water-line and conducting it to the circulation, so as to be returned to the boiler, together with a sufficient quantity of incoming cold water derived from any suitable source, I am thereby enabled to overcome many disadvantages attendant upon an intermittent feed, besides obviating the liability of explosions, and effecting a rapid and economical production of steam.

I am aware of the patents to J. E. Burdge, No. 95,983, October 19, 1869; G. M. Mullen, No. 124,373, March 5, 1872; and C. M. Bridges, No. 167,639, September 14, 1875, and do not claim the construction and arrangement of devices therein shown. It will be understood, however, that I do not confine myself to the precise details of construction herein described, as it is obvious that the construction of various parts of my apparatus may be varied in many ways without departing from the spirit of my invention, the essential feature of which consists in automatically supplying the boiler with a constant feed of more water than is required to be made into steam, and conveying the surplus, by means of an eduction-tube at the desired water-line, to a receiver, which is also supplied with cold water, the contents of said receiver being constantly delivered to a pump which returns the water to the boiler, thus maintaining a positive water-line therein, which may be much lower than ordinary, and obviating the liability to explosion, which is attendant upon an intermittent feed. By means of this constant feed the water in the boiler is also maintained at a more even temperature than has been heretofore attained, and a much lower water-line may be safely employed, thus rendering it possible to make steam with greater rapidity, uniformity, and safety, and with a less expenditure of fuel, than is usually required.

Having thus described my invention, what I claim as new, and desire to secure by Letters Patent, is—

1. The herein-described method of supplying steam-boilers with feed-water, consisting essentially in the continuous supply of more water than is evaporated, the surplus being conveyed from the boiler by means of an eduction-pipe at the water-line and returned to the circulation, whereby a uniform water-level is constantly maintained within the boiler, substantially as described.

2. In an automatic feed-water regulator for steam-boilers, the combination, with a boiler and a pump, of a receiver for hot and cold water, said receiver having an overflow-nozzle and an air-vent, and being adapted to receive the overflow hot water from the boiler and cold water from any suitable supply, and to deliver its contents to the pump to be constantly fed to the boiler, whereby a uniform water-line is maintained in said boiler, substantially as described.

3. In an automatic feed-water regulator for steam-boilers, a receiver for hot and cold water, having an overflow-nozzle, an air-vent, a supply pipe or pipes for hot and cold water, and an outlet to a pump, substantially as described.

4. In an automatic feed-water regulator for steam-boilers, a cut-off check-valve having an entrance for water and steam above the valve, and a valve-stem extending up through a packing-box and actuated to positively seat the valve by a spiral spring, substantially as shown and described.

5. In an automatic feed-water regulator for steam-boilers, the combination of the cut-off check-valve F′ with the means for operating the same, consisting of the trips *h h*, attached to a pump or its connections, substantially as shown and described.

6. In an automatic feed-water regulator for steam-boilers, the combination, with the boiler A and supply-pump B, connected by pipe *a*, of the receiver C, having one or more inlets for hot and cold water, an outlet to the pump, an overflow-nozzle, and an air-vent, and the valve F′, placed between said boiler and receiver, and communicating with each through pipes *e e′*, respectively, whereby the overflow hot water from the boiler is conveyed to the receiver to heat the incoming cold water, and the whole automatically fed to the boiler, substantially as shown and described.

In testimony that I claim the foregoing I have hereunto set my hand this 11th day of January, 1882.

NICHOLAS CLUTE.

Witnesses:
PHILIP MAURO,
A. R. BROWN.